R. W. FARIS.
Traveling Thrashing-Powers.

No. 142,621. Patented September 9, 1873.

Witnesses:

Inventor:

UNITED STATES PATENT OFFICE.

RICHARD W. FARIS, OF MURFREESBOROUGH, TENNESSEE.

IMPROVEMENT IN TRAVELING THRASHING-POWERS.

Specification forming part of Letters Patent No. 142,621, dated September 9, 1873; application filed May 17, 1873.

*To all whom it may concern:*

Figure 1:
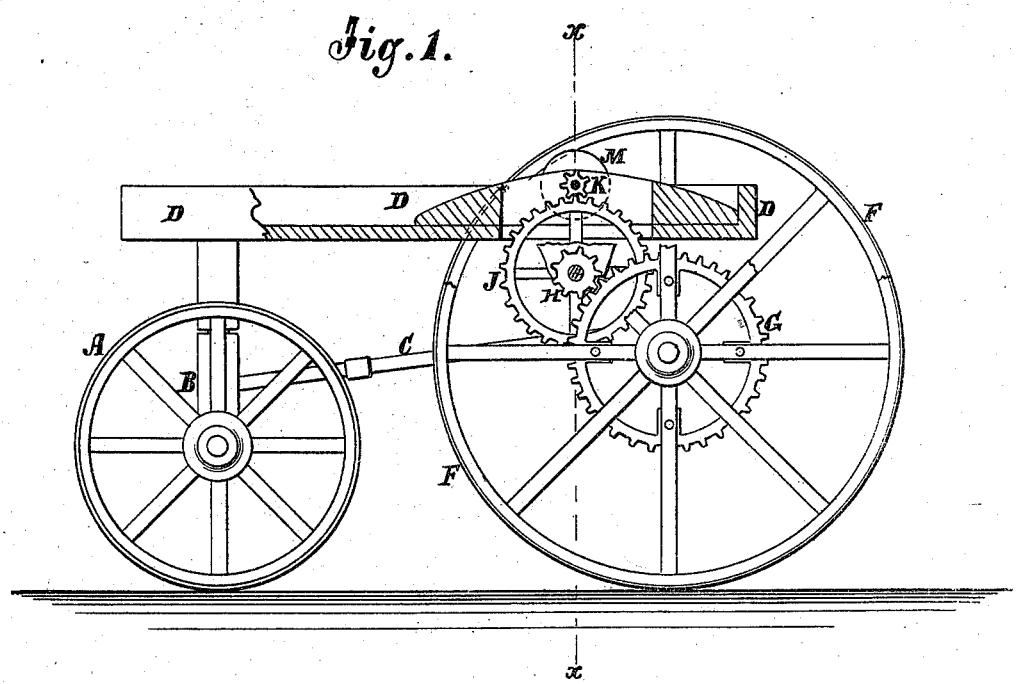
Figure 2:
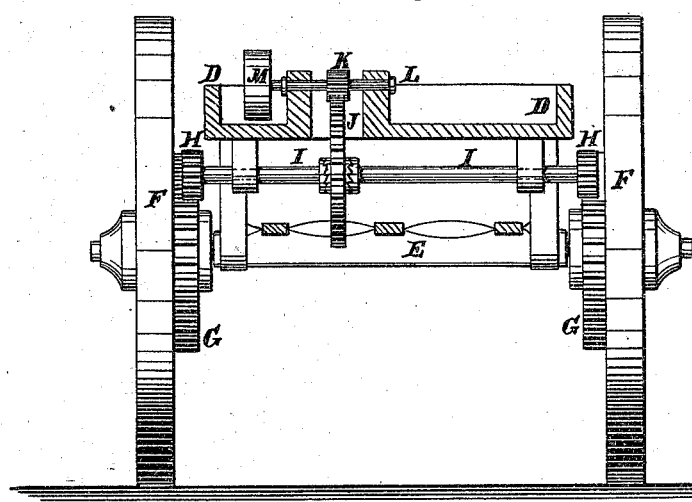

Be it known that I, RICHARD W. FARIS, of Murfreesborough, in the county of Rutherford and State of Tennessee, have invented a new and useful Improvement in Traveling Thrasher-Power, of which the following is a specification:

Figure 1 is a side view of my improved traveling power, part being broken away to show the construction. Fig. 2 is a vertical section of the same taken through the line $xx$, Fig. 1.

Similar letters of reference indicate corresponding parts.

My invention has for its object to furnish an improved power for driving a thrasher, so that each shock of wheat or other grain may be thrashed while passing to the next shock, thus saving much of the labor required in harvesting grain. The invention consists in the combination of the gear-wheels or equivalent gearing, the shafts, and the band-wheel, with the rear wheels and box of a wagon for driving a thrasher mounted upon said wagon, as hereinafter fully described.

A represents the forward wheels, B the forward axle, C the reach, D the box, E the rear axle, and F the rear wheels, of a wagon. To each of the rear wheels F, which should be about five feet in diameter, is attached, or upon it is formed, a gear-wheel, G, about two feet in diameter. Into the teeth of the gear-wheels G mesh the teeth of the small gear-wheels H about six inches in diameter, and which are attached to the ends of a shaft, I, which extends across the wagon, and revolves in bearings attached to the box D, or other convenient part of the wagon. Upon the shaft I is placed a gear-wheel, J, about eighteen inches in diameter, and which is provided with a clutch upon each side, so that the wheel I may be kept in motion when the wagon is turning, or even when one wheel is standing still. The upper part of the wheel J projects through an opening in the bottom of the wagon-box D, and into its teeth mesh the teeth of the small gear-wheel K, about four inches in diameter, and which is attached to a short shaft, L. The short shaft L works in bearings attached to the wagon-box D, and to it is also attached the band-wheel M, about twelve inches in diameter, and which is connected with the pulley or band wheel of the thrasher-cylinder.

By this arrangement the thrasher-cylinder will make about seventy-two revolutions to each revolution of the wheels F. A still greater speed may be obtained by varying the size of the wheels, or by employing more wheels.

For convenience the wagon-box D should be about five and a half feet wide and twelve feet long. This will give a space of about five and a half by six feet in front of the thrasher for the grain, the band-cutter, and the feeder. At one side of the thrasher there will be a space of about two and a half by six feet for the thrashed grain and the measurer.

By this construction the grain can be thrashed in the field, a shock at a time, each shock being thrashed while moving to the next shock, so as to greatly diminish the time and labor required for harvesting grain.

Having thus described my invention, I claim as new and desire to secure by Letters Patent—

The combination of the gear-wheels G H J K, or equivalent gearing, the shafts I L, and band-wheel M, with the wheels and box of a wagon for driving a thrasher mounted upon the wagon, substantially as herein shown and described.

R. W. FARIS.

Witnesses:
J. T. McKINLEY,
J. H. REED.